United States Patent
Palatov et al.

(10) Patent No.: US 11,550,025 B2
(45) Date of Patent: Jan. 10, 2023

(54) METHODS FOR OPTIMIZATION IN GEOLOCATION USING ELECTRONIC DISTANCE MEASUREMENT EQUIPMENT

(71) Applicant: SECOND BRIDGE INC., Beverly Hills, CA (US)

(72) Inventors: Dennis Palatov, Portland, OR (US); Marc Ganouna, Beverly Hills, CA (US); Pete Stoppani, Redmond, WA (US)

(73) Assignee: SECOND BRIDGE INC., Beverly Hills, CA (US)

( * ) Notice: Subject to any disclaimer, the term of this patent is extended or adjusted under 35 U.S.C. 154(b) by 137 days.

(21) Appl. No.: 17/272,347

(22) PCT Filed: Aug. 29, 2019

(86) PCT No.: PCT/IB2019/057285
§ 371 (c)(1),
(2) Date: Feb. 28, 2021

(87) PCT Pub. No.: WO2020/044280
PCT Pub. Date: Mar. 5, 2020

(65) Prior Publication Data
US 2021/0325504 A1    Oct. 21, 2021

(30) Foreign Application Priority Data
Aug. 30, 2018 (FR) .................................. 18 70968

(51) Int. Cl.
*G01S 3/02* (2006.01)
*G01S 5/14* (2006.01)
*G01S 5/02* (2010.01)

(52) U.S. Cl.
CPC .............. *G01S 5/14* (2013.01); *G01S 5/0284* (2013.01)

(58) Field of Classification Search
CPC . G01S 3/02; G01S 5/14; G01S 5/0284; G01S 5/0205; G01S 5/0289
USPC ......................................................... 342/458
See application file for complete search history.

(56) References Cited

U.S. PATENT DOCUMENTS

| | | |
|---|---|---|
| 2006/0050651 A1 | 3/2006 | Brignone et al. |
| 2007/0005292 A1 | 1/2007 | Jin |
| 2008/0309556 A1 * | 12/2008 | Hohl ............ H04W 64/00 342/451 |
| 2021/0325504 A1 * | 10/2021 | Palatov ............ G01S 5/14 |

FOREIGN PATENT DOCUMENTS

| | | | | |
|---|---|---|---|---|
| WO | WO-2015049717 A1 * | 4/2015 | .......... | G01C 21/005 |
| WO | WO-2021174237 A2 * | 9/2021 | | |

* cited by examiner

*Primary Examiner* — Harry K Liu
(74) *Attorney, Agent, or Firm* — Im IP Law; Chai Im; C. Andrew Im

(57) ABSTRACT

A method of determining a new position for a node. The node having a distance measuring radio. A list of positions of a plurality of neighboring nodes is obtained. The geometric relationship of the positions in the list and the predicted position of node is analyzed. A subset of the nodes is selected from the list that is less than the total number of modes in the list. Electronic distance measurements from the node to each of the subset of nodes are performed. A new position of the node is determined utilizing the measured distances.

7 Claims, 4 Drawing Sheets

METHODS FOR OPTIMIZATION IN GEOLOCATION USING ELECTRONIC DISTANCE MEASUREMENT EQUIPMENT

RELATED APPLICATIONS

This application is a § 371 application of PCT/IB2019/057285 filed Aug. 29, 2019, which claims priority from French Patent Application No. 18 70968 filed Aug. 30, 2018, each of which is incorporated herein by reference in its entirety.

FIELD OF THE INVENTION

The present invention relates to methods for geolocation utilizing electronic distance measurement equipment.

BACKGROUND OF THE INVENTION

Geolocation using distance measurement equipment employs a plurality of distance measurements from a node to other nearby nodes with known positions in order to determine the local node's position. Many such systems are known in the art. Known methods usually attempt to obtain as many such measurements as possible in order to reduce error by averaging, filtering and other statistical and numerical techniques. Accuracy of position in such systems is improved with increased number of nodes, which makes it desirable to have as many nodes as possible.

With known peer-peer distance measurement technologies, a node can only measure the distance to one other node at a time. Further, unless multiple channels are used, only one pair of nodes within range of radio transmissions can be measuring the distance between them at any given time, to avoid interference from other nodes using the same radio spectrum. Multiple scheduling and arbitration techniques are well known and practiced in the art, including TDMA, CDMA and others.

In a system that attempts to collect all possible distance measurements, when N nodes are present, $(N*(N-1))/2$ measurements need to be scheduled and performed. This means that radio usage demand increases exponentially with the number of nodes. Employing multiple radio channels can in some cases improve system response but it significantly complicates scheduling and does not fundamentally solve the problem. In some implementations the results of such measurements then need to be collected and distributed to all participating nodes in order for each node to determine its position, potentially further increasing bandwidth demand. As a result the commonly used approaches do not scale well and system response time degrades significantly when number of nodes is increased.

When the number of nodes is decreased, the accuracy of conventional approaches also decreases and the system becomes more prone to error and outright failure.

In the above referenced co-pending application, methods of geolocation are disclosed that select a small subset of only the most favorable measurements among all that are available, based on the disclosed Confidence metric and the geometry of the relative positions of available nodes. In many embodiments, only at most three measurements are used to determine the Position of any given node in accordance with the disclosed methods, while the rest are discarded. In the embodiments having N nodes, only at most $(N*3)/2$ measurements are actually used, providing potentially linear scalability as opposed to exponential for conventional approaches.

What is needed is a means of determining in advance which measurements are likely to be the most favorable and only performing the requested measurements, greatly reducing the radio usage as a result. The present invention teaches methods that provide the desired means.

SUMMARY OF THE INVENTION

The terms "invention", "the invention", "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the detailed description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

The primary objective of the present invention is to significantly reduce the radio utilization required for accurate peer-to-peer geolocation of a plurality of nodes, in order to improve scalability and overall system response.

The present invention achieves its objective by disclosing methods comprising a sequence of steps, starting with determining which among a set of available neighboring nodes would provide the most favorable distance measurements for determining a node's position, selecting only those nodes for distance measurement, and then performing only the selected distance measurements.

More specifically, the invention relates to a method of determining a new Position for a Node n, said Node having a distance measuring radio, said method comprising the steps of:

a) Obtaining a list of Positions of a plurality of neighboring Nodes, b) Analyzing the geometric relationship of the Positions in said list and the predicted Position of Node n, c) Selecting subset of the Nodes from said list that is less than the total number of Nodes in said list, d) Performing electronic distance measurements from Node n to each of said subset of Nodes, e) Utilizing distances obtained in step d) to determine a new Position of Node n.

According to a particular embodiment, the selection in step c) is based on most favorable geometric relationship of Nodes in said list to the predicted Position of Node n.

According to a particular embodiment, step a) further comprises obtaining corresponding Confidence metrics for each said Position in said list, and the selection in step c) is based at least in part on said Confidence metrics.

According to a particular embodiment, the number of Nodes selected in step c) is at most 3.

According to a particular embodiment, the method further comprises step f) transmitting said measured distances to said subset of Nodes.

According to a particular embodiment, step a) further comprises receiving a previously measured distance from at least one among a plurality of neighboring Nodes, and comprising step d) Performing electronic distance measurements from Node n to each of said subset of Nodes for which a previously measured distance was not received in step a).

According to a particular embodiment, if Node n is moving, performing the steps a) to e), otherwise if Node n is not moving taking no measurements and using the predicted Position of Node n as the new Position of Node n.

BRIEF DESCRIPTION OF THE DRAWINGS

The present invention is described herein with reference to the following drawings.

DETAILED DESCRIPTION OF AN EMBODIMENT OF THE INVENTION

The illustrative embodiment presented herein utilizes in part the methods disclosed in the above referenced co-pending application, in particular the methods for selecting a subset of Nodes based on geometry and Confidence, and the methods for determining the Position of Node n having two or three distance measurements to other Nodes. These methods are included in the following description for reference, however they are outside the scope of the present invention.

The scope of the present invention pertains specifically to the sequence of first selecting a subset of Nodes from a plurality of available Nodes, by any known or future method, subsequently performing distance measurements only to the selected nodes, and then determining a Node's Position based on said measurements, by any known or future method.

Figure 1:
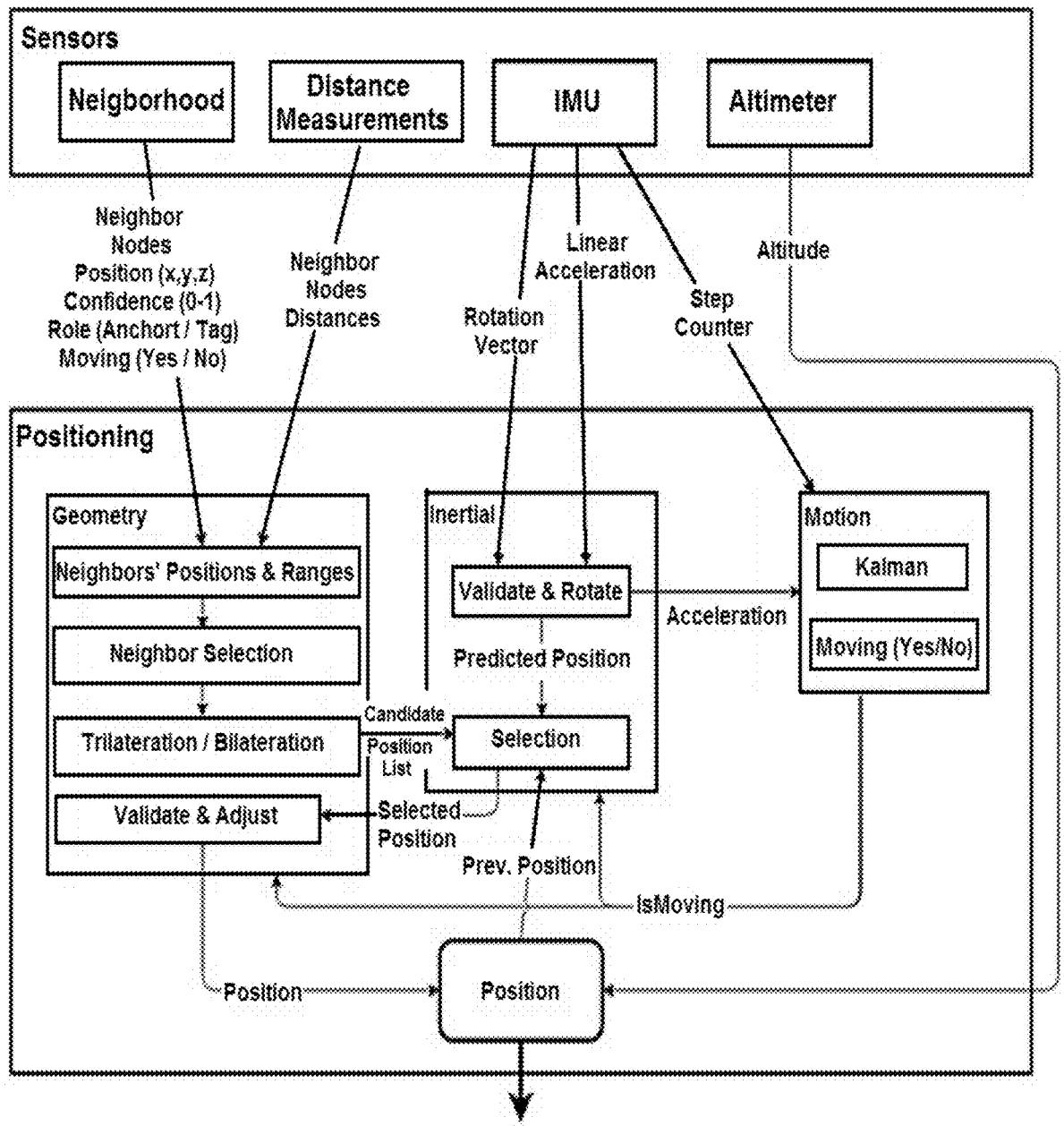
FIG. 1 shows the major functional blocks of an illustrative embodiment, and the data flow between them.

FIG. 1 is a diagram of the overall data flow for an illustrative embodiment of the present invention.

In order to determine a node's Position, information is gathered from a variety of sensors. In the context of the illustrated embodiment, the position data of neighboring nodes and the measured distances to such nodes are considered sensor inputs. Other typical sensors include inertial measurement unit (IMU), magnetometer, altimeter and the like.

In the illustrated embodiment, the IMU and altimeter are contained within the hardware portion of a node.

Information about the locations of neighboring nodes is transmitted to the node via a data radio. In some embodiments, a single node will be designated as the Neighborhood Manager responsible for periodically collecting and disseminating this information among the nodes. In other embodiments, this information may be transferred collaboratively peer-to-peer. Many methods for transferring information among a plurality of nodes are known. The details of such methods are outside the scope of the present invention.

Distance measurements between nodes are performed by means of a distance measuring radio. A number of such methods are known. The illustrated embodiment utilizes Decawave DW1000 distance measuring radios, but a number of others are readily available.

Sensors:

Altimeter provides relative altitude.

IMU: The Inertial Measurement Unit such as the BNO080 consists of 3 axis accelerometer, gyroscope and magnetometer. These are typically fused (internally in most modern IMUs) to provide virtual sensors such as linear acceleration and step counter along with a rotation vector to transform the linear acceleration with magnetic North.

Distance measurement: The Distance measurement module (such as an UWB radio) provides the distances from the current Node to nearby Nodes.

Neighborhood: In the context of the illustrated embodiment, Neighborhood is a set of Nodes managed by a Node functioning as the Neighborhood Manager (NHM). Each Node broadcasts its position information via XNet. The NHM maintains a Neighborhood Database (NHDB) of the Nodes in its neighborhood. Each Node in the neighborhood receives the position information for each of its neighbors. This information includes:

X, Y, Z coordinates where:
X is the West (negative) and East (positive) axis,
Y is the North (positive) and South (negative) axis,
Z is elevation.
Role:
Anchor: stationary Node with accurately measured position.
Tag: moving or stationary Node whose position is calculated via Positioning.
A stationary Tag is referred to as a Breadcrumb.
State: Moving or Stationary,
Confidence.

Confidence: Key positioning values such as the coordinates and distances have an associated confidence value with a range of 0.0 to 1.0 where 0.0 indicates no confidence and 1.0 indicates absolute confidence. Other numeric scales can be used in different embodiments. Whenever positioning chooses among Node data for calculating a position estimate, it uses the confidence of the data to choose the best (most confident) data.

Only anchors have a pre-assigned and constant confidence, set to 1.0. A tag's confidence is calculated based on the confidence of the data is receives from sensors, distance measurement and neighbor Nodes used to calculate a tag's position.

A tag's Position confidence can decrease over time due to data errors, lack of Precision, and time lag between data updates; confidence decreases with data age. As mentioned above, the confidence never increases on its own, it can only increase if the confidence of incoming new data is higher than currently available data.

Modules:

Positioning consists of the following modules:

Inertial Navigation System (INS): Given a starting position, the INS module takes inertial inputs from the IMU and converts them X and Y offsets to compute a predicted Position.

Geometry: Given neighbor Node's positions and distances, the Geometry module computes one or more candidate Positions of the local Node.

Motion: Given inertial inputs, the Motion module computes whether the local Node is in motion and it computes the direction of travel.

Geometry Module (GEO): GEO uses neighbor Node positions and distances to compute one or more candidate Positions for the local Node. Neighbor positions are provided by the NHM and distances to nearby Nodes are provided by Distance measurement; both are delivered as sensor readings. These are combined into a list of Neighbor Descriptors (ND).

GEO recalculates the estimated position at the same rate as Distance measurement is able to provide distances updates. Each Node implementation may have different Distance measurement technology and thus the update rates vary by Node.

Figure 2:
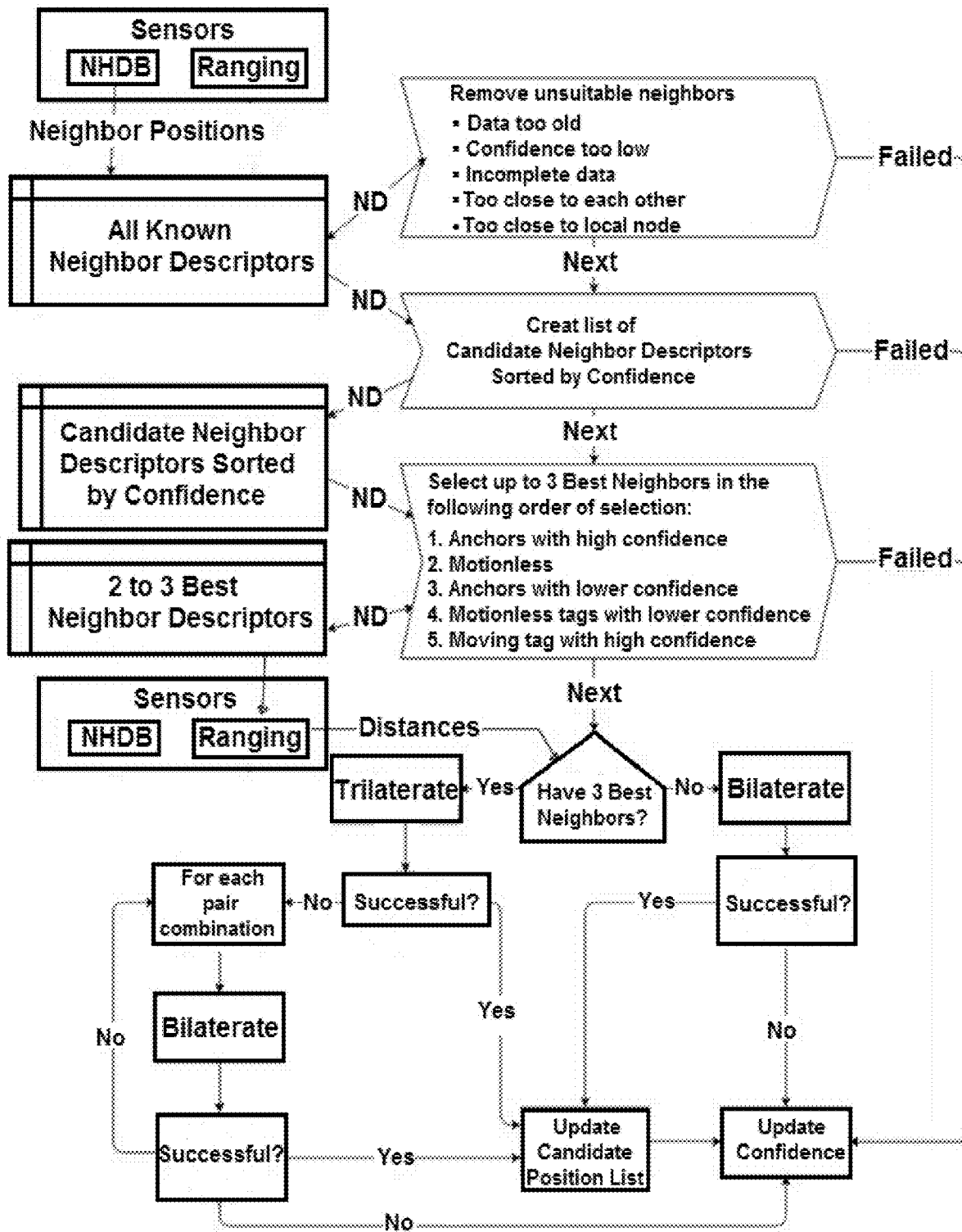
FIG. 2 is a diagrammatic illustration of an embodiment of the methods of the present invention.

GEO's position calculation is shown in the flow chart shown in FIG. 2 and summarized below:

1. Remove unsuitable neighbors from the ND List. Desirable neighbors are those with high confidence, recent position and distance data, and are positioned favorably.
2. Calculate interpolated position of Tag neighbors.
3. Sort ND List by confidence.
4. Select up to three best neighbors based on role (preferring Anchors over non-moving Tags over moving Tags) and Confidence.
5. Perform distance measurements only to the selected Nodes.
6. If there are only two neighbors, attempt to use Bilateration to calculate two candidate Positions.
7. If there are three neighbors, attempt to use Trilateration to calculate a single candidate Position. If Trilateration fails, attempt to use to Bilateration on each neighbor pair combination to calculate several pairs of candidate Positions.
8. Report the list of candidate Positions to the INS module. Each of the above steps may end the calculation due to an insufficient number of usable neighbors. In such cases GEO will report the previously calculated position with a reduced confidence. Thus, as time passes without enough neighbors, GEO's reported position confidence decreases.

Trilateration/Bilateration

Figure 3:
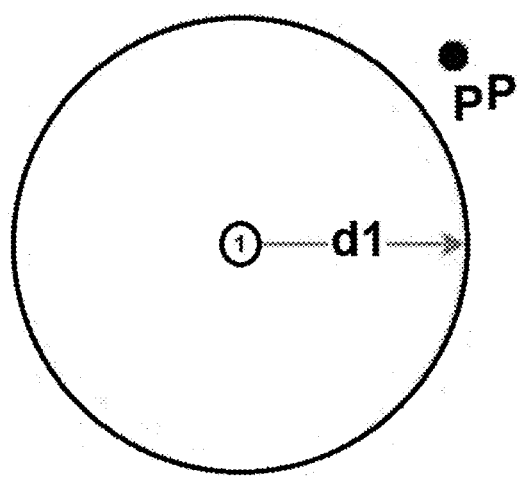
FIG. 3 illustrates the ambiguity of distance measurement with only one available reference node resulting in infinite number of candidate positions along the circumference of the circle.

Given one Anchor and a Tag and a distance between them of d1 all that is possible is to say that the Tag lies somewhere on the circle with it center at Anchor 1 with radius d1 (cf. FIG. 3). This information is not sufficient to calculate a finite list of candidate Positions. However, having the predicted Position pP from the INS module, it is possible to adjust the associated Confidence. If pP lies on the circle or near it, its Confidence can be increased. If pP is far from the circle, its confidence can be decreased.

Figure 4:
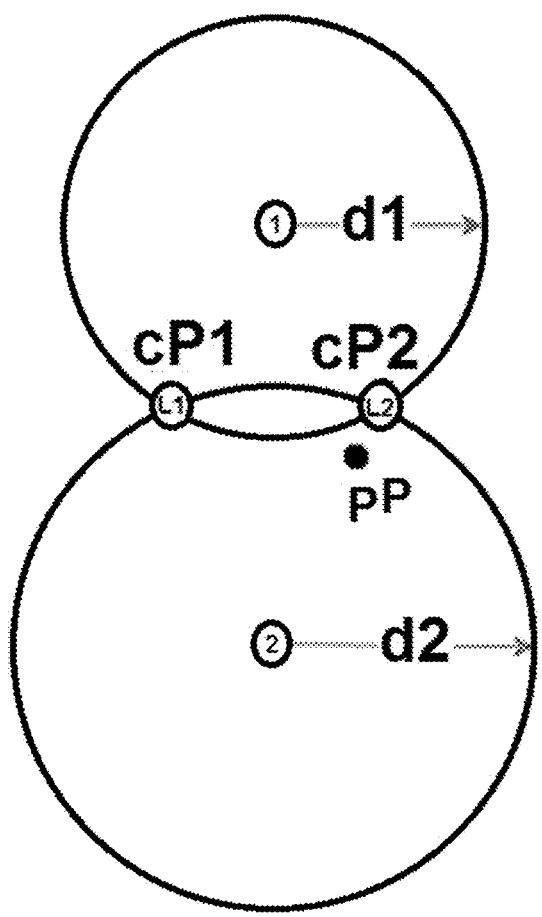
FIG. 4 shows reduction in ambiguity with two available reference nodes with favorable geometry, resulting in two candidate positions at Circle-Circle intersections.

Given two Anchors and a Tag and the distances to the Anchors d1 and d2, we can calculate two possible candidate Positions cP1 and cP2 at the intersections of the two circles around the Anchors as shown in FIG. 4. Having a predicted Position pP from the INS module, the closer candidate Position can be chosen over the other (cP2 in the illustrated case). As in the previous example, the magnitude of the distance between cP2 and pP can be used as the basis for adjusting Confidence.

Figure 5:
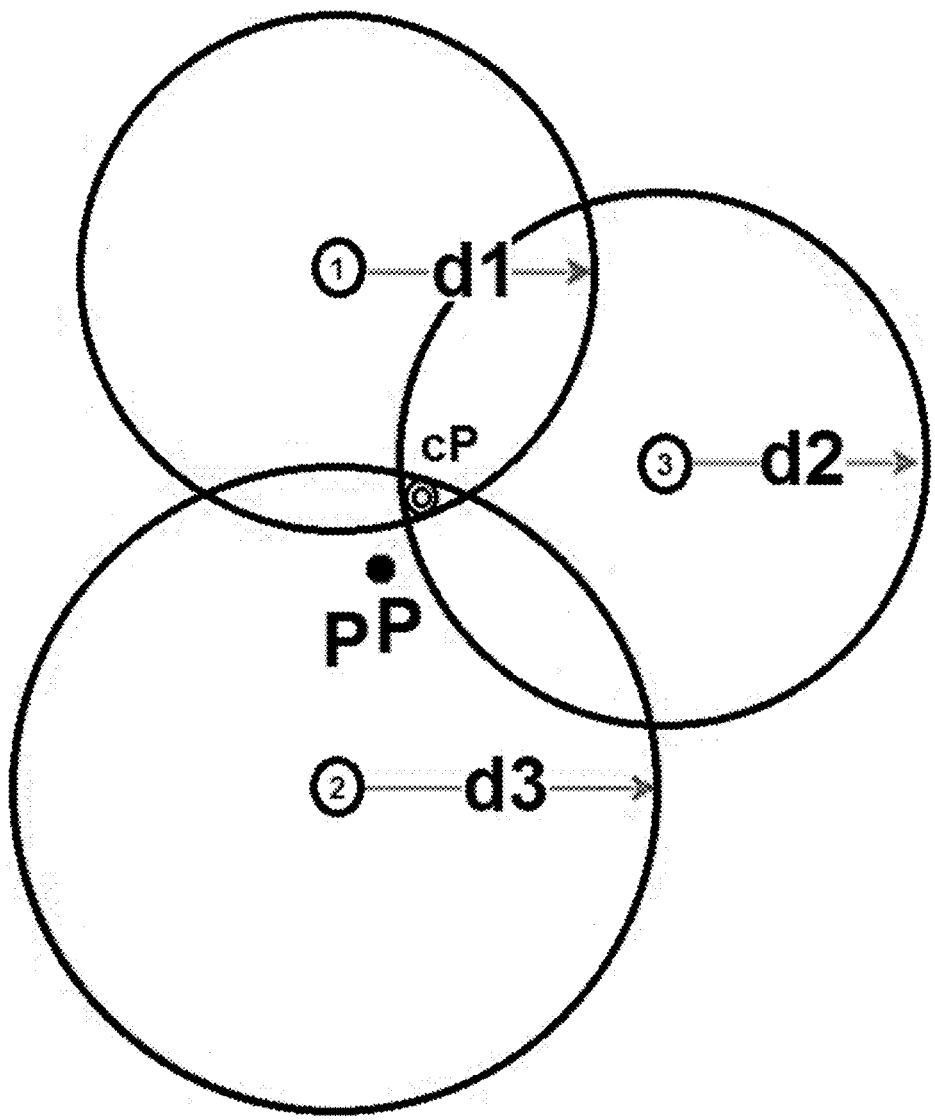
FIG. 5 shows further reduction in ambiguity to a single candidate position when three reference nodes with favorable geometry are available.

With three anchors it is possible to calculate a single candidate Position cP of the tag to be at the center of the intersection of all three circles. This scenario is illustrated in FIG. 5. Like in previous examples, the magnitude of the distance between cP and pP, especially as it compares to the inherent Precision of the distance measuring technology being used, can be evaluated to adjust Confidence.

Inertial Navigation Module (INS)

INS takes inertial inputs from the IMU and converts them X and Y offsets and adds them to the previous position to compute a new predicted Position and associated Confidence. A large amount of inertial activity will reduce Confidence, while little or no detected inertial activity will, in some embodiments, increase Confidence.

A second function of the INS is to receive a list of geometric candidate Positions from the GEO module, and select among them based on distance from predicted Position and relative Confidence. In some scenarios, the predicted Position may be selected over all candidate Positions. In other scenarios, a new position may be calculated that is a weighted average of the closest candidate Position and predicted Position, with weights being at least in part proportional to respective Confidence.

Motion Module (MOT)

MOT takes inertial inputs from INS and computes whether the local Node is in motion and it computes the direction of travel (bearing). The result of motion computation may be used to adjust Confidence of the node's Position and also may be used to switch node roles between Anchor, Breadcrumb and Tag. Node roles are used by the GEO module as criteria for selecting most favorable sets of distance measurements, with the highest preference being given to Anchors, then Breadcrumbs, then Tags. A Breadcrumb, within the context of the illustrated embodiment, is a Tag that has been stationary for an extended period of time. The primary difference between an Anchor and a Breadcrumb, in the illustrated embodiment, is that an Anchor's position is explicitly known and assigned when the Anchor is placed. A Breadcrumb's position was calculated when it was moving as a Tag, but has higher Confidence than that of a moving Tag due to having been stationary and having the benefit of a number of repetitive measurements being considered over time to reduce error.

According to a particular embodiment, the method of determining a new Position for a Node n, said Node having a distance measuring radio, said method comprising the steps of:

a) Starting with a previously determined previous Position P, said previous Position having a previously determined Confidence C, calculating a predicted Position pP, and an associated predicted Confidence pC, said calculations utilizing data from at least a 3-axis Inertial sensor, b) If said data from inertial sensor indicated that Node n has not moved, taking the previous Position as the new Position and skipping all subsequent steps, c) Obtaining a list of available neighboring Nodes, their associated Positions, and the associated Confidence metrics, d) For each pair of available neighboring Nodes in the list, evaluating the geometric relationship between Pn1, Pn2, and pP, e) If the evaluation of step d) shows favorable geometry, adding nodes N1 and N2 to the selected subset of Nodes, f) From the selected subset of Nodes in step e) choosing three Nodes with the highest Confidence associated with their Position, g) Electronically measuring at least a first distance Dn1 to at least a first other Node n1, at least a second distance Dn2 to at least a second other Node n2, and at least a third distance Dn3 to at least a second other Node n3, h) Transmitting the value of Dn1 to node N1, the value of Dn2 to node N2 and the value of Dn3 to node N3, i) Obtaining the current Position Pn1 of at said first other Node, Position Pn2 of said second other Node, and Position Pn3 of said third other Node, said Position comprising at least X, Y, Z coordinates and a Confidence metric Cn1, Cn2 and Cn3, j) Using trilateration with positions Pn1, Pn2 and Pn3 and corresponding measured distances Dn1, Dn2 and Dn3 to determine at least a candidate Position cP, k) Determining a candidate Confidence cC as the lesser of Cn1, Cn2 and Cn3, then adjusting said Confidence cC based on geometric conditions of the calculations in step d), l) If confidence cC is greater than pC, choosing candidate position cP as new position P and taking cC as the new confidence C, otherwise choosing predicted position pP as new position P and predicted confidence pC as new confidence C.

According to another particular embodiment, the method of determining a new Position for a Node n, said Node having a distance measuring radio, said method comprising the steps of:

a) Starting with a previously determined previous Position P, said previous Position having a previously determined Confidence C, calculating a predicted Position pP, and an associated predicted Confidence pC, said calculations utilizing data from at least a 3-axis Inertial sensor, b) If said data from inertial sensor indicated that Node n has not moved, taking the previous Position as the new Position and skipping all subsequent steps, c) Obtaining a list of available neighboring Nodes, their associated Positions, and the associated Confidence metrics, d) For each pair of available neighboring Nodes in the list, evaluating the geometric relationship between Pn1, Pn2, and pP, e) If the evaluation of step d) shows favorable geometry, adding nodes N1 and N2 to the selected subset of Nodes, f) From the selected subset of Nodes in step e) choosing two Nodes with the highest Confidence associated with their Position, g) Electronically measuring at least a first distance Dn1 to at least a first other Node n1, and at least a second distance Dn2 to at least a second other Node n2, h) Transmitting the value of Dn1 to node N1 and the value of Dn2 to node N2, i) Geometrically projecting the distances Dn1 and Dn2 onto a common horizontal plane, to determine projected distances pDn1 and pDn2, j) Calculating Circle-Circle Intersections of said projected distances to determine two candidate Positions cPa and cPb, k) Determining a candidate Confidence cC as the lesser of Cn1 and Cn2, then adjusting said Confidence cC based on geometric conditions of the calculations in step e), l) Determining the error distance eDa between pP and cPa, and error distance eDb between pP and cPb, m) Choosing the candidate Position with the lesser error distance as the candidate Position cP and the corresponding error distance as the error distance eD, n) Calculating new position P as a weighted interpolation between at least the predicted position pP and candidate position cP, and o) Calculating new confidence C as a weighted interpolation of predicted confidence pC and candidate confidence cC.

The embodiments disclosed herein are illustrative and not limiting; other embodiments shall be readily apparent to those skilled in the art based upon the disclosures made herein, without departing from the scope of the present invention.

The invention claimed is:

1. A method of determining a new position for a node, the node having a distance measuring radio, the method comprising:
    a) obtaining a list of positions of a plurality of neighboring nodes;
    b) analyzing a geometric relationship of the positions in the list and a predicted position of node;
    c) selecting a subset of nodes from the list that is less than a total number of nodes in the list;
    d) performing electronic distance measurements from the node to each of the subset of nodes; and
    e) determining a new position of the node utilizing the electronic distance measurements obtained in step d).

2. The method of claim 1, wherein the selection of the subset is based on a most favorable geometric relationship of nodes in the list to the predicted position of node.

3. The method of claim 1, further comprising obtaining corresponding confidence metrics for each position in the list; and wherein the selection of the subset is based at least in part on the confidence metrics.

4. The method of claim 1, wherein a maximum number of nodes in the subset is 3.

5. The method of claim 1, further comprising transmitting the electronic distance measurements to the subset of nodes.

6. The method of claim 1, further comprising receiving a previously measured distance from at least one among the plurality of neighboring nodes; wherein the electronic distance measurements are performed from the node to each of the subset of nodes for which the previously measured distance was not received therefrom.

7. The method of claim 1, wherein if the node is moving, performing the steps a) to e), otherwise if the node is not moving, taking no measurements and using the predicted position of node as the new position of node.

* * * * *